May 1, 1934.  C. EYMANN  1,957,254
METHOD FOR THE CONVERSION OF GASES OR GAS MIXTURES AT HIGH TEMPERATURES
Filed Sept. 7, 1931
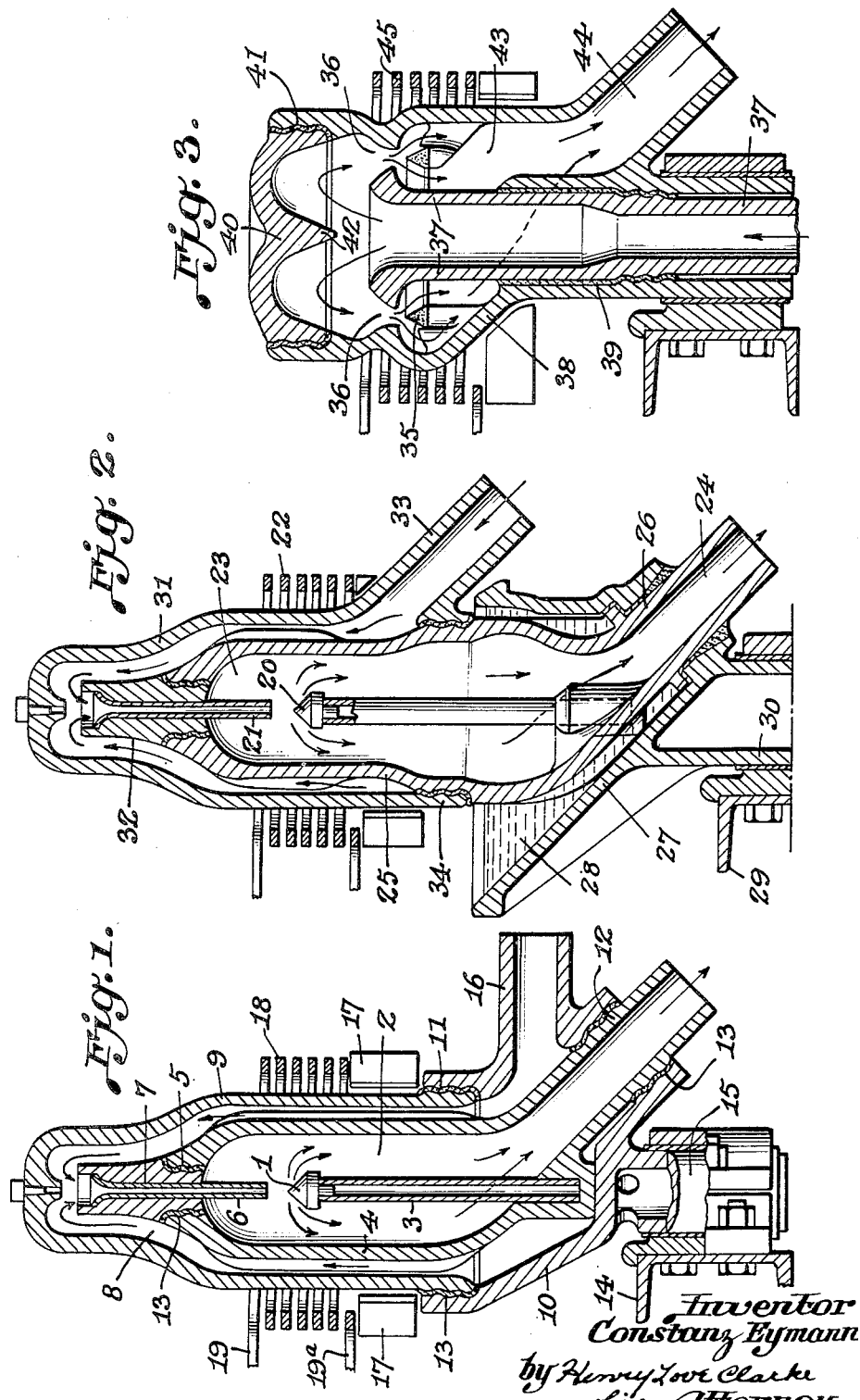
Inventor
Constanz Eymann
by Henry Love Clarke
his Attorney.

Patented May 1, 1934

1,957,254

UNITED STATES PATENT OFFICE 1,957,254

METHOD FOR THE CONVERSION OF GASES OR GAS MIXTURES AT HIGH TEMPERATURES

Constanz Eymann, Essen-on-the-Ruhr, Germany, assignor, by mesne assignments, to The Koppers Company of Delaware, Pittsburgh, Pa., a corporation of Delaware Application September 7, 1931, Serial No. 561,514
In Germany September 8, 1930

7 Claims. (Cl. 23—288)

The invention relates to the conversion of gases and gas mixtures, for instance methane at high temperatures, whereby the gases to be treated are to be heated up extremely quickly and then to be cooled down rapidly.

For carrying out such conversions of the gas, up to the present, an electric arc light is preferably made use of by means of which, for example, the methane is so heated up that same is decomposed into acetylene and carbon. However, the heating up of the gases by means of an electric arc light has various disadvantages. First of all, the carbon in the arc light coming from the electrodes is troublesome when carrying out most of the conversions of the gases. Moreover, the cooling down of the gases, which have been highly heated up in the arc light, or the rapid drawing off of same from the arc light is very difficult and finally when heating up gases by means of an electric arc light, catalysts for the decomposition of the gases cannot be made use of.

Now, the object of my invention is to provide a contrivance by means of which, in order to convert gases into useful products, sudden heating up and rapid cooling down of the gases to be treated is rendered possible, and this also as the case may be in the presence of my suitable catalyst.

In the case of the contrivance according to this invention, the gas to be treated is blown through a nozzle on to a body arranged in a closed oven chamber, which body consists of a metal with a high melting point, which is arranged insulated in the magnetic field of an induction coil, through which a high frequency alternating current passes, said coil being arranged outside of the oven chamber, in such a way that it is brought up to a high temperature by passing through a high frequency current. The walls of the oven chamber, surrounding the metal body, are during this procedure cooled down by the reaction gases being blown on to the metal body. Preferably, the metal body heated up by the high frequency current, according to this invention, is so shaped that the gases impinging the metal body, after coming in contact with same, are led off against the cooled walls of the oven chamber.

Further, there is provided, according to this invention, between the coil, through which the high frequency alternating current passes and the wall of the oven chamber, a chamber serving as a means for cooling down the oven wall.

Finally, according to this invention, the cooling chamber of the oven wall is brought into connection with the inlet nozzle for the gases to be treated, in such a way that these gases before they enter the nozzle, are led through the cooling chamber of the oven wall and are warmed up in same.

A further object of the invention is to provide a special type of oven, in which the metal body to be heated up is placed, by means of which it is rendered possible to build the walls of the oven of highly refractory ceramic material, for instance, sillimanite or the like, thus employing very few shapes of brick to form the walls of the apparatus.

With these and other objects of my invention in view I will now describe the nature of the present invention, according to the drawing attached in which Fig. 1 shows a vertical section of an oven constructed, according to this invention and Figs. 2 and 3 are vertical sections through other constructions forming the object of the invention.

In case of the construction shown in Fig. 1, the metal body 1 which serves for the sudden heating up of the gases to be treated, has principally the form of a cone and is fixed to the end of a tubular shaped support 3 in the reaction chamber 2. The reaction chamber 2 is approximately cylindrical. The walls are built of ceramic material and have a bottle like form 4, which has an opening provided with threads 5 at the end opposite to the metal body 1 in which a cap 7 is screwed in, likewise consisting of ceramic metal and fitted with a nozzle 6 serving for guiding the gases. The nozzle 6, which is set tightly into the cap screw 7, is thereby so arranged, that its lower opening lies exactly opposite to the point of the conical metal body 1 and is situated in the longitudinal axis of the cylindrical oven chamber 2.

The nozzle 6 opens out outside of the oven chamber 2 into the space between the two casings 8 which is formed by a ceramic body 9 placed over the oven body 4. The body 9 resembles a hood and is provided below with a thread 11 serving to fix same in a casing 10. In the casing 10 is moreover fixed also the inner oven body 4 with a neck 12 bent sideways. The joints between the various parts of the oven, for the purpose of rendering same tight, are filled with a ceramic cement, as is shown on the drawing at the points 13.

The casing 10 of the oven, preferably made of a ceramic material, has below a pedestal 15 serving to fix the oven to the foundation 14.

Moreover, the casing 10 has a pipe branch 16 serving to introduce the gases to be treated into the inner chamber of the oven.

On the outside of the oven hood 9, there is provided approximately at the height of the metal body 1 to be heated up, and resting on a strut 17 consisting of an insulating material, a coil 18 composed of rectangular copper wire or the like, the ends of which 19 and 19a are connected up to a generator, not shown on the drawing, for the production of a high frequency alternating current. According to the frequency, the tension and the strength of the alternating current supplied from the source of current, the number of the coils of the spiral wires 18 and the thickness of the wire is so determined that the metal body in the interior of the oven is brought up to a high temperature, such for example as 1600–2000° C., by the lines of force given off by the spirals, when the high frequency current passes through same.

In making use of the contrivance shown in Fig. 1 for the conversion of a gas, the gas to be treated is conducted through the pipe branch 16 into the interior of the oven shell compartment. The gas takes the path, indicated by the arrows on the drawing, through the shell chamber, is warmed up there by the heat taken up from the walls of the inner oven chamber and thus cools same and finally finds its way to the upper end of the hood 9. From there the gas streams through the nozzle into the oven chamber and comes therein into direct contact with the highly heated metal body immediately after leaving the nozzle and is suddenly heated up. The gas is then led off sideways by the conical metal body 1 and is led forward symmetrically against the coled walls of the oven chamber 2, whereby the previously heated gases are rapidly cooled down. The products produced by the conversion of the gas are finally drawn off from the oven chamber by the pipe branch 12.

In the case of the construction shown in the Figure 2 of the accompanying drawing, the arrangement of the metal body 20, of the nozzle 21 serving for the admission of the gases and of the wire coil 22 for heating the metal body is identical with the construction shown in Fig. 1. The oven chamber, however, is in the case of the construction shown in Fig. 2, only formed approximately cylindrically as regards the part 23 close to the metal body 20. Towards the bottom it widens out and then runs into a narrow pipe 24, through which the products resulting from the conversion of the gas are removed from the oven chamber. The walls of the oven chamber are formed by a ceramic hollow body 25 approximately of pear like shape which has an extension 26 at its lower end, bent sideways by means of which the oven 25 is fixed in a recess of a support and cooling receiver 27 having a cup like form. The receiver 27 is formed in such a way that it can be filled with a cooling fluid 28, for instance water, so that the lower widened part of the oven body 25 is sprayed by the cooling liquid. For the purpose of fixing the entire oven to a frame 29 the receiver 27 has an outside pedestal 30.

The upper part of the oven body 25 is in the case of the construction according to Fig. 2 covered over by a hood 31 consisting of ceramic material in such a way that there is formed between the hood and the upper part of the oven, a space 32. In this shell opens out sideways a tubular branch 33 through which the gases to be treated are led into the shell chamber from which they are similarly as in the case of the construction according to Figure 1 carried forward through the nozzle 21 into the interior of the oven. In order to prevent thereby an escape of the gas from the shell space through the joints between the hood body 32 and the oven wall 25, these joints are filled out with a cement 34.

In Fig. 3 of the attached drawing, there is given a form of construction according to the invention, in which the metal body serving for heating up the gas to be treated has the form of a ring. In the case of this construction, the metal ring body 35 runs upwards in an edge lying opposite to the ring slit 36. This ring slit has the same function as the nozzle 6 and 21 respectively in Figs. 1 and 2. The ring slit 36 is limited on the one hand by a ceramic pipe 37 provided with a widening on the top and on the other hand, by a tubular body 38 which is arranged round this pipe. The joint 39 is rendered tight between the two tubular bodies by suitable cement. Through the inner pipe 37, the gases to be treated are led in. They enter through the upper opening of the tube 37 into the widened top end of the outer tubular body 38 which is closed by means of a cover 40 and a sealing mass 41 being used thereby. The cover 40 has in the middle a conical shape projection 42, whereby the stream of gas passing out of the tube 37 is divided up symmetrically in such a way that the the ring slit 36 is uniformly impinged.

The gases stream through, after entering the upper end of the outer tubular body 38 through the ring slit 36, strike then the metal body 35 and leave finally the oven space 43 between the outer tubular body 38 and the inner tube 37 through a tubular branch 44 fitted to the outer part of the body 38.

As in the construction shown in Figs. 1 and 2 there is provided outside of the oven body at the height of the metal ring 35 a wire spiral 45 comprising a flat copper wire, the ends of which are connected with a high frequency alternating current source, not shown, however, on the drawing.

In the case of the construction shown in Fig. 3 a special cooling of the oven walls is not provided for, it is, however, of course always possible to cool the oven walls down from the outside, by means of any suitable gaseous or liquid medium.

For the building of the walls of the oven chamber and of the shell chamber a material must be used, which does not conduct the electrical current and which can be heated up to a high temperature without effecting, to any dangerous degree, its solidity. Preferably the walls of the oven should be made of sillimanite.

As a suitable material for the metal body to be brought up to a high temperature, tungsten metal is chosen, the melting point of which lies about 3300°. Such a body allows for instance gas temperatures to be reached as are required in a manufacture of acetylene from methane. In case it is intended to recover principally soot from the metal, it will be of advantage to make the metal body of iron and to heat up to a temperature of 1000–1200° C.

In case the oven according to this invention is intended for a recovery of acetylene and hydrogen from methane the procedure for example is as follows:

The metal body consists in this case of tungsten metal and is brought to a temperature of about 2800° C. The methane gas to be treated is directed at such a speed against the metal body that it remains about 1/500–1/1000 parts of a second in contact with the metal body. The walls of the oven chambers are kept at a temperature of below 500° C. Thereby about ⅔ of the methane used is decomposed into acetylene and hydrogen.

The gases resulting are drawn off from the oven and then cooled down to about 30° centigrade, whereupon the acetylene formed in the reaction is washed out of the gas by means of any suitable solvent preferably acetone. The gases freed from acetylene are finally led back to the oven and again heated up in order to convert further parts of the methane still contained in the gas. In certain cases it may be of advantage to add the gases freed from acetylene to fresh gases led to the oven and to tread the mixture of both gases in the oven.

In the case of this construction of the oven, the inner chamber of the oven is approximately kept under the usual pressure. It is naturally possible instead of this, to keep the oven chamber under a higher or lower pressure, this depending on which reaction in the contrivance, according to this invention, it is intended to carry out.

In conclusion I will refer in short to the use of catalysts in the case of the contrivance according to the invention. The manner of making use of the catalysts is determined according to whether, it is employed during the heating up or the cooling period or in both cases. Accordingly, the catalysts may be fixed to the surface of the metal body fitted in the oven chamber or on the walls of the oven chamber or on both.

The invention as hereinabove set forth is embodied in a particular form, but may be variously embodied within the scope of the claims hereinafter made.

I claim:

1. In the catalytic conversion of gases wherein the reactants are heated up and then suddenly cooled, the step of heating the contact mass over which the gases are passed by passing a high frequency electric current through a conductor wound about the catalyst chamber.

2. In the conversion of gases wherein the reactants are heated up and then suddenly cooled, the step of heating the contact mass for heating up the reactants and over which the gases are passed by induction.

3. In the conversion of gases wherein the reactants are heated up and then suddenly cooled, the step of heating the contact mass for heating up the reactants and over which the gases are passed by induction produced by passing an electric current through a conductor outside the conversion chamber.

4. A method as claimed in claim 1 and which includes the step of effecting the conversion, during at least the heating up or the cooling, with the aid of a catalyst within the field of the induction current.

5. A method as claimed in claim 3 and which includes the step of effecting the conversion, during at least the heating up or the cooling, with the aid of a catalyst within the field of the induction current.

6. A method as claimed in claim 1 and which includes the step of preheating the gases to be converted and suddenly cooling the converted gases by indirect heat exchange within the conversion chamber between inflowing gas to be converted and outgoing converted gases.

7. A method as claimed in claim 3 and which includes the step of preheating the gases to be converted and suddenly cooling the converted gases by indirect heat exchange within the conversion chamber between inflowing gas to be converted and outgoing converted gases.

CONSTANZ EYMANN.